United States Patent Office 2,947,797
Patented Aug. 2, 1960

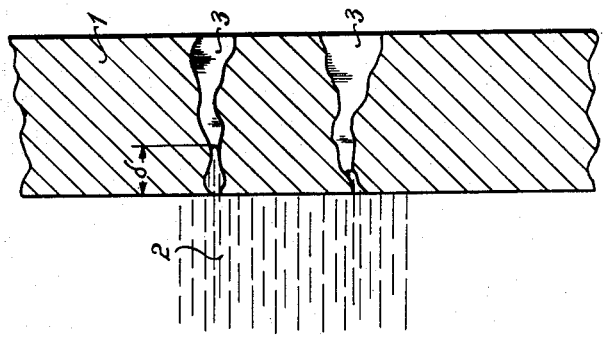
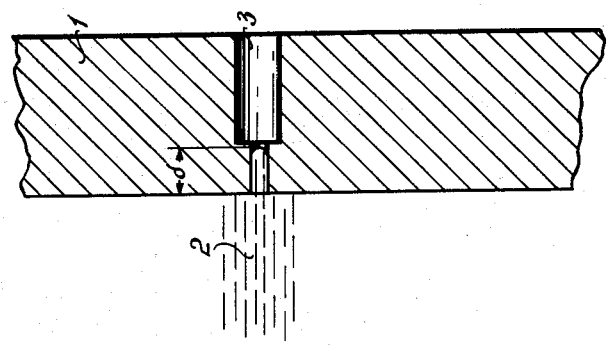
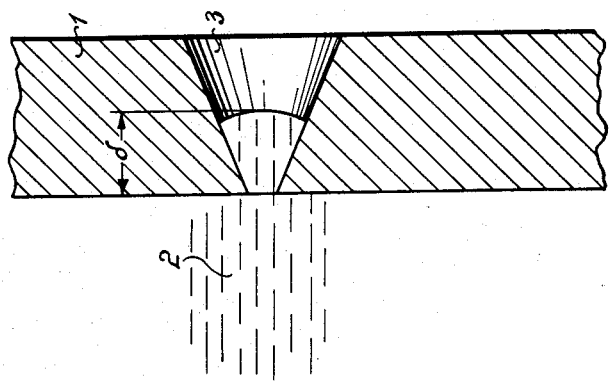

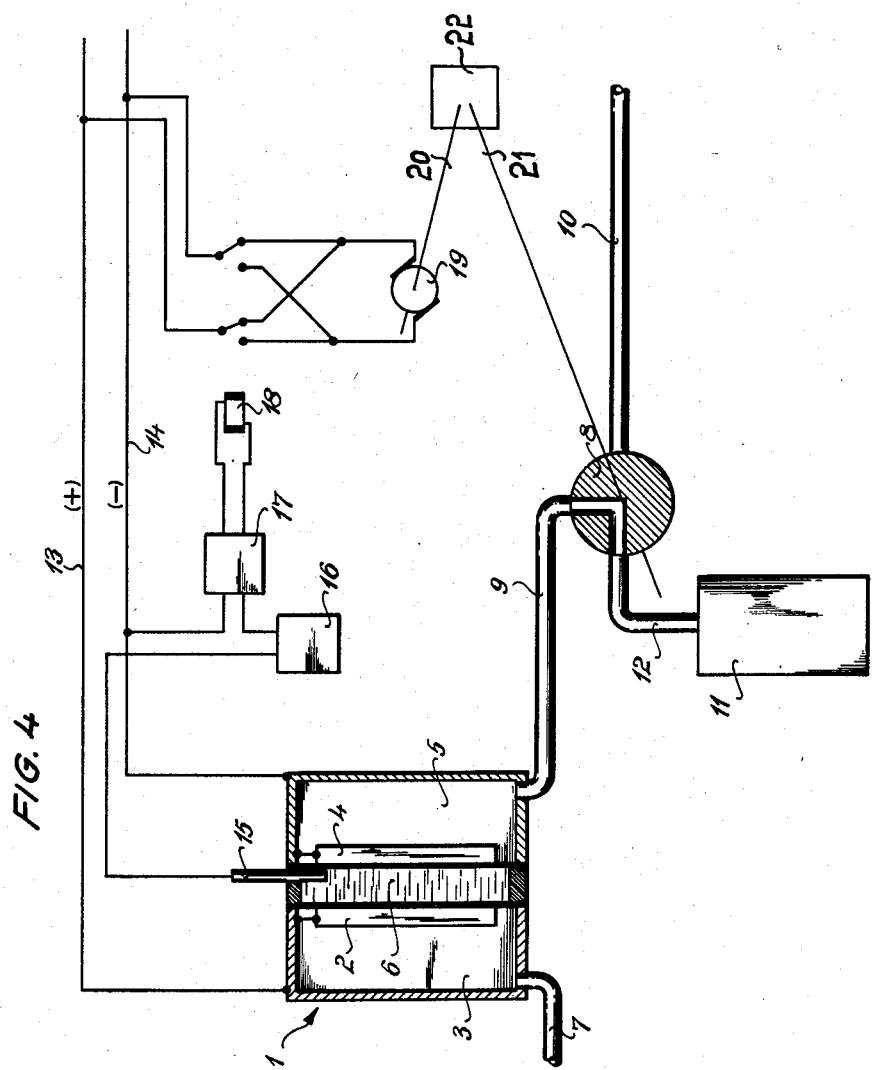

2,947,797

DIRECT PRODUCTION OF ELECTRICAL ENERGY FROM COMBUSTIBLE FUEL GASES

Eduard Justi and August Winsel, Braunschweig, Germany, assignors to Ruhrchemie Aktiengesellschaft, Oberhausen-Holten, Germany, and Steinkohlen-Elektrizitat Aktiengesellschaft, Essen, Germany, a German corporation Filed May 14, 1957, Ser. No. 659,094

Claims priority, application Germany May 18, 1956

9 Claims. (Cl. 136—86)

This invention relates to new and useful improvements in the direct production of electrical energy from fuel gases.

Fuel cells for the direct production of electrical energy from the chemical energy of combustible fuel gases are known. These fuel cells may consist of a liquid electrolyte bath, such as a potassium hydroxide solution with two porous gas-diffusion electrodes immersed therein. An oxidizing gas, such as air or oxygen or a halogen is forced through one of the porous gas-diffusion electrodes designated as the oxygen electrode, and a fuel gas, such as methane, carbon monoxide, or hydrogen, is forced through the other porous gas-diffusion electrode known as the fuel electrode.

The oxidizing gas is adsorbed in the pores of the oxygen electrode and is de-adsorbed therefrom, migrating as O$^{--}$ ions into the electrolyte, leaving behind two positive charges. The fuel gas is similarly adsorbed and de-adsorbed from the pores of the fuel electrode, migrating into the electrolyte as positively charged ions, such as H$^+$ ions in the case of hydrogen, leaving behind a negative charge. The positive and negative ions then unite to form a neutral molecule in the solution, while the charges left behind on the electrodes are utilized as electrical energy by connecting to an external circuit. In the case of O$^{--}$ ions and H$^+$ ions, the same unite in the electrolyte to form a neutral water molecule.

The efficiency of the fuel cell depends to a large extent upon the catalytically active surface of the gas-diffusion electrodes and the generation of adequate current densities at lower temperatures, as, for example, as low as room temperature, is only feasible when the adsorption surfaces of the gas-diffusion electrodes are initially highly active and remain highly active during operation.

If the fuel and/or oxidizing gas is in the form of a mixture with an inert gas, as, for example, when using air instead of pure oxygen, the inert constituents of the gas mixture accumulate in the pores of the electrode during operation, resulting in a reduction in the partial pressure of the active constituents of the mixture and preventing the active constituents from being adsorbed and de-adsorbed for the energy-producing process. The inert gases thus act as a cushion, which partially or completely prevents the supply of the active gases from being utilized and consequently results in a "choking" of the electrode.

In order to avoid this choking effect upon the gas-diffusion electrode, it has been proposed in co-pending application, Serial No. 558,094, filed January 9, 1956, to periodically blow off any accumulated inactive gas constituents from the surface of the electrode and to remove the inactive constituents from the pores of the electrodes but providing a sufficient pore size to allow fresh gas to continuously flow therethrough, causing a flushing effect.

One object of this invention is to avoid the choking effect of the accumulating inactive gas constituents on the gas-diffusion electrode and particularly in the pores of the electrode without the necessity of a continuous gas flow through the electrode pores. This, and still further objects, will become apparent from the following description, read in conjunction with the drawings, in which:

Fig. 1 is a diagrammatic cross-section of a portion of an electrode in accordance with the invention, showing the electrode pore;

Fig. 2 is a diagrammatic cross-section of a portion of an electrode in accordance with the invention, showing a still further embodiment of the pore shape;

Fig. 3 is a diagrammatic cross-section of a portion of an electrode in accordance with the invention, showing a still further embodiment of the pore shape; and Fig. 4 diagrammatically shows an embodiment of a fuel cell arrangement in accordance with the invention.

It has now been found in accordance with the invention that this choking effect may be avoided by utilizing a gas-diffusing electrode in which the average pore cross-sectional size increases from one surface to the other as at least one of the electrodes in the fuel cell, maintaining this electrode in the cell with its surface having the smaller average pore cross-sectional size in contact with the electrolyte, and periodically increasing the pressure of the gas in contact with this electrode to a value sufficient to overcome the capillary pressure of the electrolyte in the electrode pores and force the gas through the pores, flushing out the inert constituents as the potential of this electrode falls below a predetermined value.

The invention is applicable to any type of fuel gas or oxygen electrodes in which gas which has not been electrochemically utilized is prevented from flowing through by providing pore cross-sectional sizes on the gas-contacting surface which are larger than those on the electrolyte-contacting surface of the electrode. Electrodes of this type, the mode of operation of which is illustrated in the following description have been described in several papers of the published literature of the art, e.g. in "Die Gasdiffusions-Elektrode" by A. Schmid, Ferdinand Enke-Verlag, Stuttgart (1923). The hydrogen electrode described by Schmid consists of a porous carbon cylinder to which a platinum layer has been applied by electroplating, which layer is itself porous, but the pore radii of which are so small that the gas is prevented from flowing through at the operating pressures involved.

Bacon, in British Patent No. 667,298, dated September 5, 1950, discloses a gas diffusion electrode consisting of two porous nickel layers so that layer in contact with the electrolyte has a smaller pore radius than that in contact with the gas thereby preventing the reaction gas from flowing through in a certain pressure range.

The invention is also applicable to a gas-diffusion electrode developed by the applicants and likewise having a varying cross-sectional size from one surface to the opposite surface. The co-pending application of the applicants, Serial No. 542,434, filed October 24, 1955 and titled "Double-skeleton catalyst electrodes" discloses a process for the production of a highly active gas-diffusion electrode, in which, in a skeleton having metallic conduction and serving as a carrier, a second skeleton is embedded which consists of Raney granules. In producing these electrodes, 20 to 80% by weight of the skeleton metal in powder form are mixed with 80 to 20% by weight of the Raney alloy, the mixture is pressed to the shape of electrodes using a preferred pressing pressure of 4000 to 5000 kg./sq. cm., and the shaped bodies are sintered in a reducing atmosphere at a preferred temperature of 650° C. Thereafter, the electrode is activated by dissolving out the soluble component of the Raney alloy by means of a solution thereby developing the pores, the walls of which are covered with the highly active Raney metal.

It has been found that a defined and predetermined pore radius is obtained by choosing a defined grain size of the Raney alloy powder.

By successively giving into the electrode press mold, according to Italian Patent No. 551,420, pulverulent mixtures of skeleton metal and Raney alloy which are different in a defined manner with regard to the grain size of the Raney alloy powder, it is possible to produce DSK electrodes, the pore cross-sectional size of which varies from one surface to the other in a certain manner. Thus, it is especially possible by appropriately applying the process to realize the pore shapes represented in Figs. 1 to 3.

When a gas-diffusion electrode, which has an average pore cross-sectional size, increasing from one surface to the other, is placed in a fuel cell with the electrolyte in contact with the side having the smaller pore cross-sectional size and the gas in contact with the surface having the larger pore cross-sectional size, the electrolytes tend to enter the pores with a certain capillary pressure. If the smaller portion of the pores are designated as having a radius $r_1$, and the larger pore size is designated as having a radius $r_2$, then the capillary pressure in the portion of the pores having the radius $r_1$ may be designated as $P_{K_1}$ and the capillary pressure in the larger portion of the pores having the radius $r_2$ may be designated as $P_{K_2}$. If, however, the cross-sectional size of the pores of the electrode increases progressively from the electrolyte-contacting surface to the gas-contacting surface as shown in Fig. 1 and Fig. 3, $r_1$ is understood to be the pore radius at the narrowest point of the pore while $r_2$ is the pore radius directly on the gas-contacting surface of the electrode.

In normal operation the gas pressure should be such that the same just counteracts the capillary pressure in the pores and the gas electrolyte interphase occurs within the pores. For this purpose, the operating pressure of the gas-diffusion electrode must range between the two capillary pressures. If the operating pressure is designated $P_g$, $P_g$ must have a value between $P_{K_1}$ and $P_{K_2}$ ($P_{K_1} > P_g > P_{K_2}$). The electrolyte against the operating pressure $P_g$, due to the capillary pressure, will penetrate into the pores to a certain average depth $\delta$, thus preventing the gas from flowing completely through the pores and entering unused into the electrolyte.

If, as shown in Fig. 1 and Fig. 3, the cross-sectional size of the pores increases progressively from one side of the electrode to the other, the electrolyte meniscus will establish itself at a point where the gas pressure is in equilibrium with the capillary pressure. Here again, the condition is that the gas pressure $P_g$ satisfies the relation $P_{K_1} > P_g > P_{K_2}$. The only difference as compared with an electrode having an irregularly varying pore radius consists in that the depth of penetration, $\delta$, is not a constant one in the range of $P_{K_1} > P_g > P_{K_2}$ but is dependent upon $P_g$ within this range.

It is unimportant whether the average increase in the cross-sectional size of the pore opening from the electrolyte-contacting surface to the gas-contacting surface of the electrode increases gradually, step-wise or irregularly, provided that there is such an average increase.

As shown in Fig. 1, the cross-sectional size of the pore of the electrode 1 increases progressively from the electrolyte side 2 to the gas side 3. As shown in Fig. 2, the cross-sectional size increases by increments, as, for example, in the case of a nickel electrode, while in Fig. 3 the pores are irregular and the increase in size is correspondingly irregular. Most electrodes, due to the method of producing the same, will have irregular and different shaped pores and therefore will correspond to Fig. 3.

If the gas pressure at 3 is maintained at the value $P_g$ between $P_{K_1}$ and $P_{K_2}$, then the pressure of the electrolyte will reach equilibrium with the gas pressure within the pores with the electrolyte penetrating in the pores to the depth $\delta$, as shown in the figures.

In accordance with the invention, the pressure of the gas maintained in contact with the electrode, as, for example, the combustible gas or the oxidizing gas, after the potential of the electrode has dropped to a certain minimum value, is increased from the operating pressure $P_g$ to a flushing pressure $P_s$, which is greater than the capillary pressure $P_{K_1}$, causing the gas to flow through the pores, forcing the electrolyte therefrom, and removing the inert gases which have accumulated in the pores by flushing the same into the electrolyte. The flushing of the inert gases from the pores results in an increase in the potential of the electrode, and when the desired value is reached, the pressure of the gas may be then again reduced to the pressure $P_g$ for normal operation with the electrolyte again penetrating into the pores to the depth $\delta$, preventing electrically chemically unused gas from flowing through the pores to the electrolyte being wasted.

The potential of the gas-diffusion electrode is preferably continuously determined by maintaining a test or standard electrode in the electrolyte solution. Any electrode having a defined potential may be used as the reference electrode. However, the conventional reference electrodes such as hydrogen electrodes or electrodes of the second type such as the calomel electrodes, mercury/mercury oxide electrodes and the silver/silver oxide electrodes will be preferably used. The reference electrode is connected with the cell by means of an electrolyte siphon, the opening of which terminates directly before the electrode being controlled. This minimizes the resistance polarization included. When the potential drop to the predetermined minimum value is determined by this standard or test electrode, the pressure of the gas for the flushing operation is increased and again decreased when the predetermined potential is again reached as determined by the standard or test electrode.

Either the fuel and/or oxygen electrode may be operated in this manner. When fuel gas mixtures which contain inert constituents are used as the fuel gas, it is desirable to operate the fuel electrode in this manner and when oxidizing gas mixtures, such as air are used as the oxidizing gas, it is preferable to operate the oxygen electrode in this manner.

In accordance with a preferred embodiment of the invention the increasing of the pressure from $P_g$ to $P_s$ and the reduction of the pressure from $P_s$ to $P_g$ is automatically controlled in response to variations in the potential of the gas-diffusion electrode. Preferably a test electrode is maintained in the electrolyte and an automatically operating control mechanism is provided, which is controlled by the potential difference between the test electrode and gas-diffusion electrode.

Referring to the embodiment as shown in Fig. 4, the fuel cell has an oxygen gas-diffusing electrode 2, oxygen chamber 3, a fuel gas-diffusion electrode 4, a fuel gas chamber 5, and an electrolyte bath 6. The electrolyte in the electrolyte bath 6 is in contact with a surface of the oxygen electrode 2 and a spaced-apart fuel electrode 4. The electrodes are porous and have pores, the cross-sectional size of which increases from one surface to the other with the surface having the smaller pore cross-sectional size being in contact with the electrolyte. An oxidizing gas, such as oxygen is forced in the oxygen gas chamber 3, enters the pores of the oxygen electrode 2, being adsorbed and de-adsorbed in these pores, and entering the electrolyte in the form of ions. The fuel gas is forced into the fuel gas chamber 5 through the conduit 9, entering the pores of the fuel electrode 4 being adsorbed and de-adsorbed into the electrolyte in the form of ions, thus causing a potential difference between the oxygen electrode 2 and fuel electrode 4. The casing 1 for the oxygen gas chamber 3 is electrically connected to the oxygen electrode 2 and forms the positive pole of the cell. The casing for the fuel gas chamber 5 is connected to the fuel electrode and forms the negative pole of the cell. A current lead 13 is connected to the positive pole and a current lead 14 to the negative pole, from which the electricity generated by the cell is drawn off for utilization. Normally, the gas in the gas chambers 3 and 5 is maintained at the operating pressure $P_g$, so that the capillary pressure of the electrolyte is just balanced in the pores of the electrodes, forming the gas liquid interphase in the pores and preventing gas bubbles from bubbling through the pores and emerging through the electrolyte without electrochemical utilization.

If the oxygen electrode 2 is operated with pure oxygen, no inert constituents will accumulate in the electrode pores, so that a drop in potential of this electrode may not be noted during operation. If, however, the fuel electrode 5 is operated with a gas mixture which contains inert constituents, after a period of operation the potential of this electrode will drop, due to the accumulation of these inert constituents in the pores.

In accordance with the invention, change-over cock 8 is provided, which may alternately connect the fuel gas chamber 5 with the line 10, providing the fuel gas under the pressure $P_g$ or with the tank 11 providing gas under the flushing pressure $P_s$ which is great enough to force the electrolyte out of the pores and gas through the pores into the electrolyte.

A reference electrode 15 is maintained immersed in the electrolyte bath 6 and is connected to the counter-voltage generator or cell 16, which develops a test voltage on the reference electrode 15 of the same polarity as the polarity of the fuel electrode 4. If this constant direct current voltage on the reference electrode 15 is equal to the voltage generated by the fuel electrode 4, no current will flow from the counter-voltage generator 16. Counter-voltage generator 16 is connected to a high-ohmic direct current amplifier 17, which controls the relay 18, which, in turn, switches the servo motor 19 to run clockwise or counter-clockwise, depending upon the direction of the amplified differential voltage, thereby correspondingly turning the change-over cock 8 to switch the line 9 to the line 10 or to the line 12 and tank 11. For this purpose, the shaft 20 of the servo motor 19 and the shaft 21 of the change-over cock 8 are connected by a transmission 22 in known manner.

In operation, the test or reference voltage maintained by the generator 16 on the reference electrode 15, has a value equal to the value at which the fuel electrode 4 operates efficiently and below which the efficiency has been detrimentally affected by choking. The permissible polarization value is dependent upon the type of gas and the current density the electrode is loaded with. The permissible polarization, i.e. the deviation from the potential of the unloaded electrode, is 100 to 600 mv. and preferably 150 to 200 mv. for the fuel gas electrode and 100 to 600 mv. and preferably 200 to 300 mv. for the oxidation electrode. With the fuel electrode 4 having a lower voltage than the reference electrode 15, current from the generator 16 will flow through the amplifier 17 in such a direction as to actuate the relay 18 to turn the servo motor 19 in a direction to connect the conduit 9 to the conduit 10 through the cock 8. In this position the fuel gas in the gas chamber 5 is maintained under the pressure $P_g$ in normal operation. As the fuel cell operates under this condition, inert constituents from the gas accumulate in the pores of the fuel electrode 4, causing a gradual decrease in its potential. When its value has fallen to below that of the reference electrode 15, the current on the generator 16 flows in the opposite direction, reversing the relay 18 through the amplifier 17 and thus the servo motor 19. The reversal of the servo motor 19 switches cock 8 to connect the line 12 with the line 9, so that the gas under the flushing pressure $P_s$ flows from the tank 11 into the gas space 5, forcing the gas through the pores of the fuel electrode and flushing out the inert constituents. This again causes a rise in the potential of the fuel electrode 4, and when this potential exceeds the potential of the reference electrode 15, the current flow again reverses, reversing the relay 18, servo motor 19, and again connecting the line 9 to the line 10 by means of the cock 8, restoring normal operation, in which the liquid gas interphase is maintained in the electrode pores.

If the oxygen electrode 2 is operated with a gas mixture such as air, an identical arrangement may be provided for flushing the same out when choking has caused a drop in potential.

While the invention has been described in detail with reference to certain specific embodiments, various changes and modifications will become apparent to the skilled artisan, which fall within the spirit of the invention and scope of the appended claims.

The following example is given by way of illustration and not limitation.

Example

A DSK electrode of nickel consisting of a layer ($a$) on the electrolyte-contacting surface of 0.5 mm. thickness with a pore radius, $r_a$, of 1 $\mu$ corresponding to a capillary pressure, $P_{Ka}$, of 1.58 kg./sq. cm. and a layer ($b$) on the gas-contacting surface of 3 mm. thickness with a pore radius $r_b$ of 10 $\mu$ corresponding to a capillary pressure, $P_{Kb}$, of 0.16 kg./sq. cm. was continuously operated, at 40° C. and in 6 N KOH, as a hydrogen electrode with pure hydrogen under a pressure $P_g$ of 1.5 kg./sq. cm. gauge and with a current density of 150 ma./sq. cm. at a polarization of 180 mv. without gas bubbles passing electrochemically unused through the electrode. When using a mixture of 20% of hydrogen and 80% of nitrogen under the same gas pressure of 1.5 kg./sq. cm. gauge, the polarization, starting from 110 mv. and at as low as 50 ma./sq. cm., steadily increased within hours due to the formation of an inert gas cushion. After a polarization of 250 mv. was reached, the gas pressure was increased to 2.5 kg./sq. cm. gauge thereby forcing the accumulated inert gas through the electrode. Upon lowering the pressure to 1.5 kg./sq. cm. gauge the initial polarization value of 110 mv. was restored.

We claim:

1. In the method for generating electric current in which a pair of gas-diffusion electrodes are maintained spaced apart in an electrolyte with a surface of each electrode in contact with the electrolyte, and in which a combustible gas is passed in contact with the surface of one of said electrodes opposite the electrolyte at a pressure sufficient to maintain a gas-electrolyte interphase in the electrode pores, and in which an oxidizing gas is passed in contact with the surface of the other of said electrode opposite the electrolyte at a pressure sufficient to maintain a gas-electrolyte interphase in the pores of the electrode, the average pore cross-sectional size of at least one of said electrodes increasing from the electrode surface opposite the electrolyte to the electrode surface in contact with the electrolyte, the improvement which comprises periodically increasing the pressure of the gas passed in contact with said last-mentioned electrode to a value sufficient to overcome the capillary pressure of the electrolyte in the electrode pores and force the gas completely through the pores into the electrolyte flushing out the pores, as the potential of this electrode falls below a predetermined value.

2. Improvement according to claim 1, which includes substantially continuously determining the potential of said latter-mentioned electrode by maintaining a reference electrode in said electrolyte, and in which said gas pressure is increased when the potential of said last-mentioned electrode falls below said predetermined value as indicated by said reference electrode.

3. Improvement according to claim 1, in which said combustible gas contains inert constituents and in which said combustible gas is passed in contact with said last-mentioned electrode.

4. Improvement according to claim 1, in which said oxidizing gas contains inert constituents and in which said oxidizing gas is passed in contact with said last-mentioned electrode.

5. In the method for generating electric current in which a pair of gas-diffusion electrodes are maintained spaced apart in an electrolyte with a surface of each electrode in contact with the electrolyte and in which a combustible gas is passed in contact with the surface of one of said electrodes opposite the electrolyte at a pressure sufficient to maintain a gas-electrolyte interphase in the electrode pores, and in which an oxidizing gas is passed in contact with the surface of the other of said electrodes opposite the electrolyte at a pressure sufficient to maintain a gas-electrolyte interphase in the electrode pores, the improvement which comprises periodically increasing the pressure of the gas passed in contact with at least one of said electrodes to a value sufficient to overcome the capillary pressure of the electrolyte in this electrode's pores and force the gas completely through the pores into the electrolyte flushing out the pores as the potential of this electrode falls below a predetermined value.

6. In a full cell having a pair of gas-diffusion electrodes spaced apart in an electrolyte bath with a surface of each electrode in contact with the electrolyte, means defining a separate gas chamber in communication with the opposite side of each electrode, means for passing a fuel gas into one gas chamber, at a pressure sufficient to maintain an interphase between the gas and electrolyte in the pores of the electrode associated with that gas chamber, and means for passing an oxidizing gas into the other gas chamber at a pressure sufficient to maintain an interphase between the gas and electrolyte in the pores of the electrode associated with that gas chamber, the improvement, which comprises means responsive to potential of at least one of said electrodes for increasing the gas pressure in said chamber associated with that electrode in an amount sufficient to force the gas completely through the pores of said electrode into said electrolyte, flushing out the pores when the potential of said electrode reaches a predetermined minimum value.

7. Improvement according to claim 6, in which said last-mentioned electrode has an average cross-sectional pore size, increasing from one surface to the opposite surface and is positioned with the surface of smaller pore cross-sectional size in contact with the electrolyte.

8. Improvement according to claim 6, in which said means responsive to the potential includes a reference electrode positioned in said electrolyte.

9. Improvement according to claim 6, in which said last mentioned electrode is the electrode associated with the gas chamber having said means for passing the oxidizing gas thereinto.

References Cited in the file of this patent
FOREIGN PATENTS 667,298     Great Britain _____ Feb. 27, 1952